United States Patent [19]

Katayama et al.

[11] Patent Number: 4,499,875
[45] Date of Patent: Feb. 19, 1985

[54] CONTROL UNIT MODIFIABLE ENGINE IGNITION CONTROL APPARATUS

[75] Inventors: Hiroomi Katayama, Machida; Yoshiaki Hirosawa, Shiki; Masahiko Fujii, Yokohama, all of Japan

[73] Assignees: New Nippon Electric Co., Ltd., Osaka; Honda Giken Kogyo Kabushiki Kaisha, Tokyo, both of Japan

[21] Appl. No.: 433,911

[22] Filed: Oct. 12, 1982

[30] Foreign Application Priority Data

Oct. 12, 1981 [JP] Japan .............................. 56-160914

[51] Int. Cl.³ .............................................. F02P 5/00
[52] U.S. Cl. .................................. 123/416; 123/414; 123/643; 123/146.5 A
[58] Field of Search ............... 123/414, 416, 417, 612, 123/617, 643, 636, 146.5 A, 630

[56] References Cited

U.S. PATENT DOCUMENTS

| | | | |
|---|---|---|---|
| 3,927,648 | 12/1975 | Kawai et al. ........................ | 123/416 |
| 4,109,631 | 8/1978 | Miyao ................................. | 123/643 |
| 4,112,895 | 9/1978 | Habert ................................ | 123/414 |
| 4,175,508 | 11/1979 | Wesenmeyer et al. ............. | 123/416 |
| 4,250,858 | 2/1981 | Jeenicke et al. .................... | 123/416 |
| 4,378,771 | 4/1983 | Sawada et al. ...................... | 123/416 |
| 4,385,606 | 5/1983 | Hattori et al. ...................... | 123/416 |

FOREIGN PATENT DOCUMENTS

WO82/02927 9/1982 PCT Int'l Appl. ................. 123/414

Primary Examiner—Parshotam S. Lall
Attorney, Agent, or Firm—Staas & Halsey

[57] ABSTRACT

A control unit modifiable engine ignition control apparatus for controlling ignition timing optimally for each cylinder by processing reference position pulses, crank angle pulses and a vacuum signal generated by a reference position sensor, a crank angle sensor and a vacuum sensor which are mounted on the engine. The engine ignition control apparatus is divided into an input-output section including an input-output unit and a controller comprising a single or a combination of control units each having a minimum capacity to control a single ignition coil.

10 Claims, 8 Drawing Figures

CONTROL UNIT MODIFIABLE ENGINE IGNITION CONTROL APPARATUS

CROSS REFERENCES TO RELATED APPLICATIONS

This application is related to co-pending U.S. patent application Ser. No. 393,321 entitled "Engine Ignition Control Circuit". This application is also related to two U.S. patent applications filed concurrently herewith having U.S. patent application Ser. No. 433,913 and entitled "Engine Ignition Interpolation Apparatus", and U.S. patent application Ser. No. 433,912 and entitled "Input/Output Unit Modifiable Engine Ignition Control Apparatus" and based on Japanese Patent Applications Numbered 160912/81 and 160913/81, respectively.

BACKGROUND OF THE INVENTION

The present invention relates to an apparatus for controlling ignition timing for an engine, and more particularly to an engine ignition control apparatus easily adaptable to a variety of engines having different numbers of cylinders and reference position sensors.

Recent rapid developments in electronics technology have resulted in an increased tendency for engine ignition timing to be controlled by a digital system. For example, an electronic engine ignition control circuit for two-wheeled motorcycles is supplied with crank angle pulses generated each time the crank shaft rotates through a unit angle and reference position pulses indicative of a reference position of the crank shaft. The control circuit counts and processes the crank angle pulses with the reference position pulses being used as references for determining a dwell angle and for controlling ignition timing.

There are many kinds of engines available which have different numbers of cylinders and reference position sensors. It has been customary to provide as many different engine ignition control devices as there are varying kinds of engines. Therefore, fabricating and keeping a variety of such engine ignition control devices has been quite time-consuming and tedious.

SUMMARY OF THE INVENTION

It is an object of the present invention to provide an engine ignition control apparatus easily adaptable to all types of engines.

It is another object of the present invention to provide a control unit for each reference position sensor.

It is a further object of the present invention to provide interchangeable control units.

According to the present invention, the above objects can be achieved by an engine ignition control apparatus divided into an input-output unit comprising: an input-output section having an input signal device and as many drivers as there are ignition coils to be controlled; and a controller comprising a single or a combination of control units each supplied with an output from a reference position sensor and each for controlling the associated ignition coil in a 1 to 1 correspondence.

These together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 2, including

DESCRIPTION OF THE PREFERRED EMBODIMENTS

Figure 1:
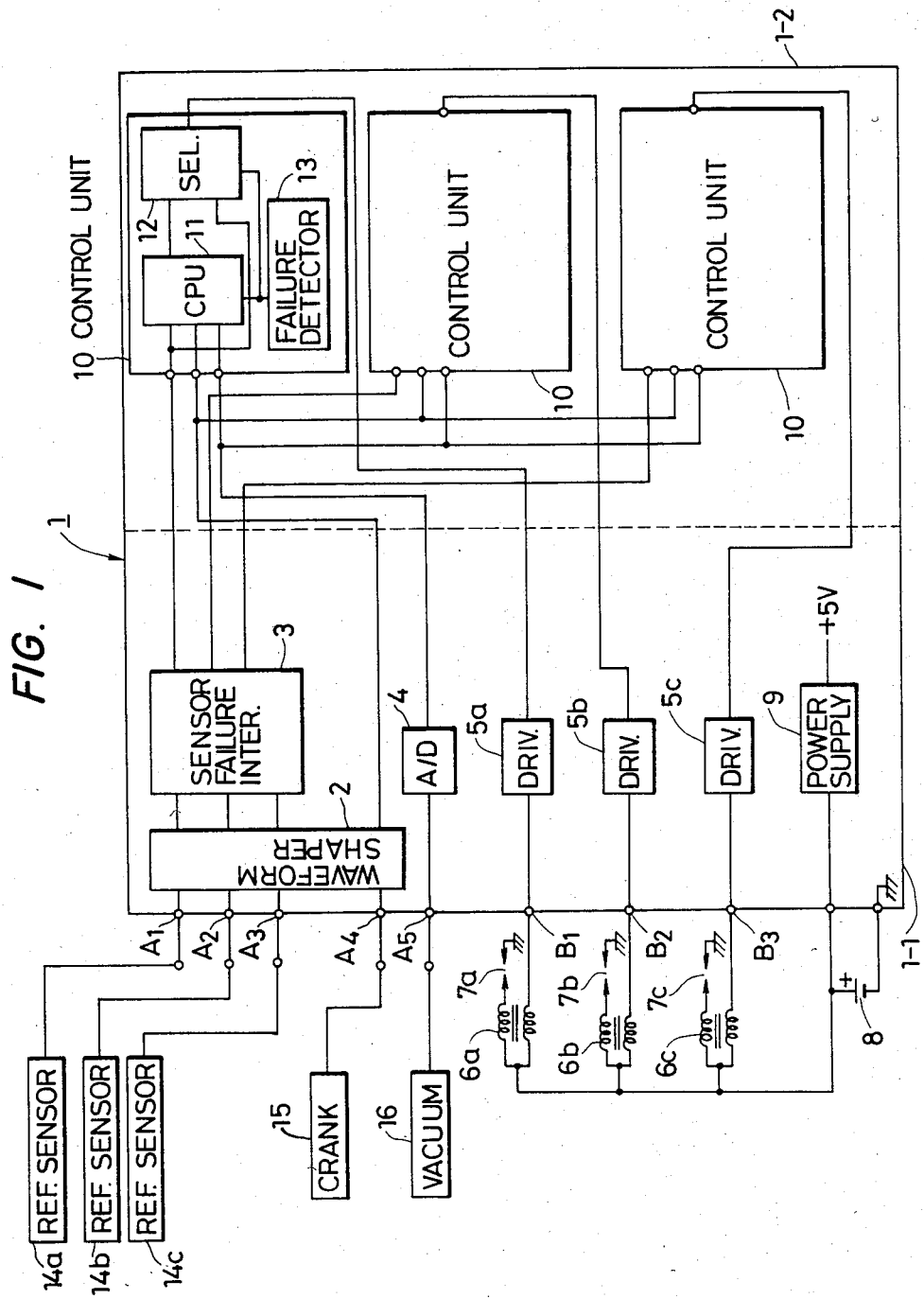
FIG. 1 is a block diagram of an engine ignition control apparatus according to an embodiment of the present invention.

FIG. 1 is a circuit diagram of an engine ignition control apparatus according to an embodiment of the present invention. The engine ignition control apparatus is shown as being incorporated into an engine for a two-wheeled motorcycle which has six in-line engine cylinders, the engine has three reference position sensors $14a$–$14c$ and six ignition coils that are grouped into three ignition coil assemblies (6 and 7). The engine ignition control apparatus includes a single input-output module or unit 1 with an input/output section 1—1 having a group of input ports $A_1$–$A_3$ for receiving three different reference position pulses, an input port $A_4$ for receiving crank angle pulses from a crank angle sensor 15, and an input port $A_5$ for receiving a vacuum signal from the vacuum sensor 16. The reference position pulses and crank angle pulses supplied to the input ports $A_1$–$A_4$ are shaped into rectangular pulses by a waveform shaper 2. A sensor failure interpolator 3 serves to interpolate reference position pulses when one or more sensors fail, so that the engine continues to run. The vacuum signal supplied through the input port $A_5$ is converted into a digital signal by an analog-to-digital converter 4. Drivers $5a$–$5c$ are supplied with ignition timing signals from control units $10a$–$10c$ (described later) for driving ignition coils $6a$–$6c$ via output ports $B_1$–$B_3$, respectively. Ignition plug combinations $7a$–$7c$ are supplied with high voltage outputs from the ignition coils $6a$–$6c$, respectively, and each of the ignition plug combinations $7a$–$7c$ comprising two ignition plugs connected parallel and mounted respectively in engine cylinders operable in opposite strokes. A power supply circuit 9 serves to convert the output from a battery 8 into a stable voltage of $+5$ V to be supplied to the semiconductor devices.

The input-output unit 1 also includes a controller 1—2 having control units $10a$–$10c$ each supplied with the reference position pulses via the sensor failure interpolator 3, the crank angle pulses via the waveform shaper 2, and the vacuum signal via the analog-to-digital converter 4 and is for controlling the ignition coils $6a$–$6c$ in a 1:1 correspondence with the reference position sensors $14a$–$14c$. Each of the control units $10a$–$10c$ comprising a central processing unit (hereinafter referred to as a CPU) 11, a data selector 12, and a failure detector 13.

Figure 3:
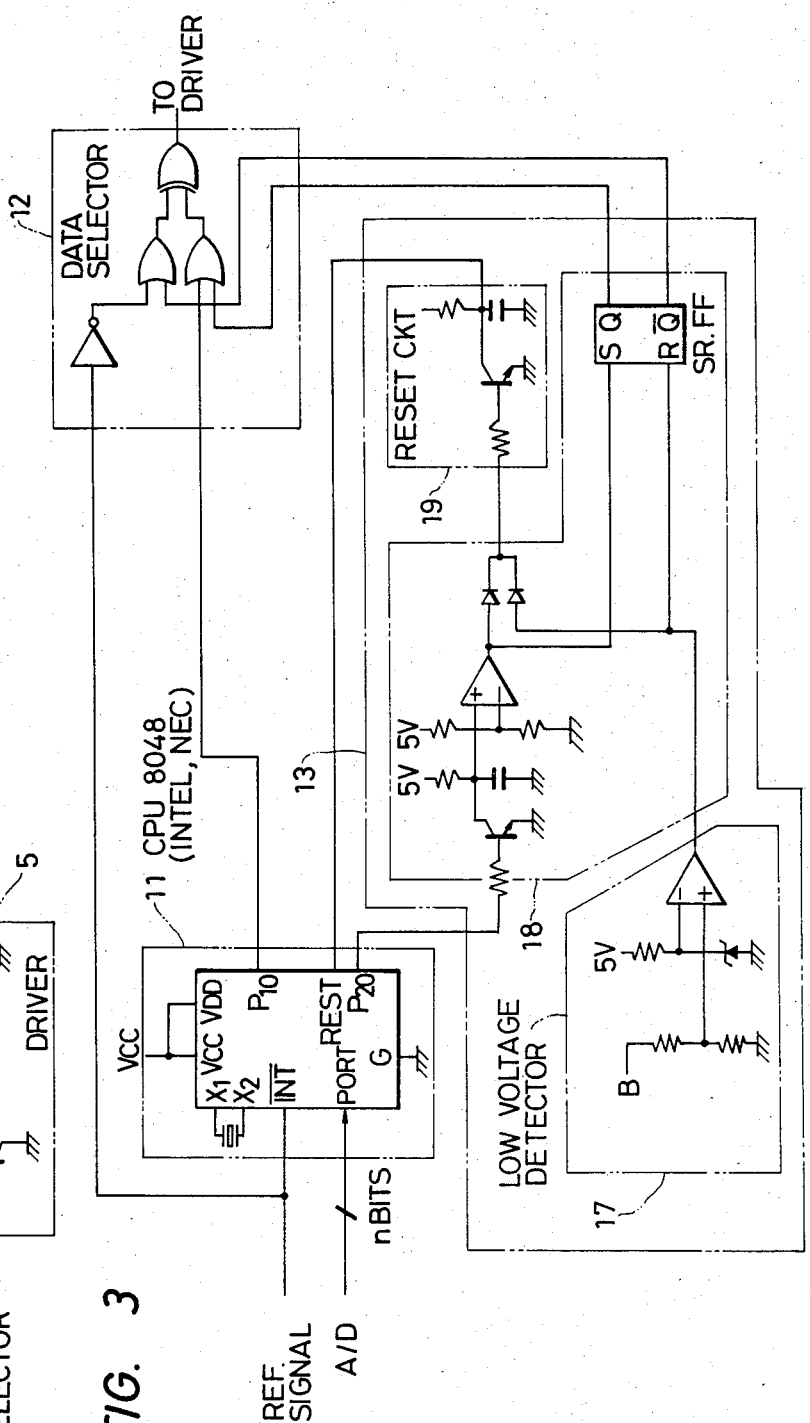
FIG. 3 is a more detailed circuit diagram of one of the control units 10 of FIG. 1.

FIG. 3 illustrates in more detail the control units $10a$–$10c$ of FIG. 1. CPU 11 receives the respective reference signal from the sensor failure interpolator 3 and provides an ignition signal to data selector 12. Data selector 12 selects either the ignition signal from the CPU 11 or the reference signal from the interpolator 3 based on the selection control signals from the failure detector 13. The data selector 12 comprises the needed OR gates and AND gate necessary to select and produce an ignition signal for the respective driver. The failure detector 13 includes a monitor circuit 18 which monitors the operating state of the CPU 11 to determine whether CPU 11 is running away or out of control and which monitors a low voltage detection signal produced by the low voltage detector 17. The failure detector provides the selection control signals to the data selector 12 and a reset control signal to a reset circuit 19. The reset circuit resets the CPU whenever a malfunction occurs. The low voltage detector 17 monitors the battery and generates the low voltage detection signal whenever the battery falls below a predetermined potential.

Figure 4:
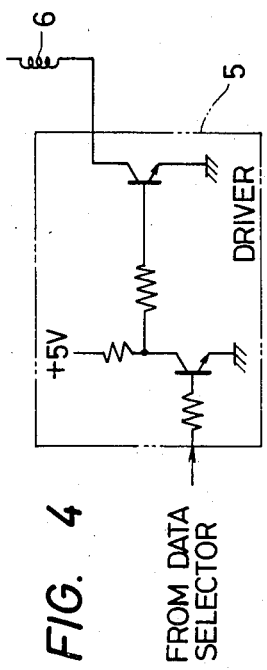
FIG. 4 is a detailed circuit diagram of one of the drivers 5 of FIG. 1.

FIG. 4 is a detailed circuit diagram of the drivers 5a–5c. The driver 5 receives the ignition signal from the data selector 12 and drives the respective coil 6 to spark the respective plugs 7.

Figure 5:
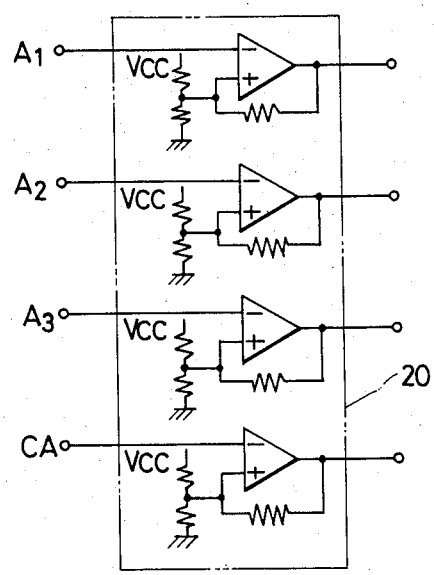
FIG. 5 is a detailed circuit diagram of a square wave circuit 20 of the shaper circuit 2 of FIG. 1.
Figure 6:
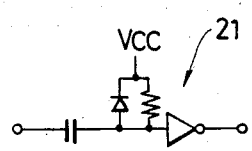
FIG. 6 is a detailed circuit diagram of a trailing edge deletion circuit 21 of the shaper circuit of FIG. 1.

FIGS. 5 and 6 illustrate the details of the circuits comprising the waveform shaper circuit 2. The reference and crank angle signals generated by the reference sensors 14 and crank sensors 15 are shaped into square waves by square wave circuit 21 of FIG. 5. The square waves have their trailing edges detected by individual trailing edge detection circuits 21 of FIG. 6. The trailing edge detection circuit 21 produces a narrow pulse which is sent to the sensor failure interpolator 3.

The sensor failure interpolator 3 includes the counters and logic circuits required to count the crank angle pulses to determine if a reference position pulse is absent and produce a replacement pulse. An interpolator circuit adaptable as the sensor failure interpolator 3 is disclosed in the related U.S. patent application previously mentioned entitled "Engine Ignition Interpolation Apparatus" incorporated by reference herein.

The engine ignition control apparatus thus constructed will operate as follows. The reference position pulses supplied to the input ports $A_1$–$A_3$ of the input-output unit 1 are shaped by the waveform shaper 2, and supplied as parallel signals through the sensor failure interpolator 3 to the CPU 11 in each of the control units 10a–10c. The crank angle pulses are supplied through the waveform shaper 2 to the CPU 11, and the vacuum signal is supplied through the analog-to-digital converter 4 to the CPU 11. Each of the control units 10a–10c is constructed to receive the reference position pulses supplied to the input ports $A_1$–$A_3$, the crank angle pulses supplied to the input port $A_4$ and the vacuum signal supplied to the input port $A_5$. The CPU 11 in each of the control units 10a–10c is responsive to the predetermined outputs from the reference position sensors for processing the crank angle pulses and the vacuum signal to issue an optimum ignition timing signal, which is supplied to each of the drivers 5a–5c via the data selector 12 in the respective control units 10a–10c. In response to the supplied timing signal, the drivers 5a–5c, respectively, energize the ignition coils 6a–6c coupled to their outputs to enable the ignition coils to supply high voltage outputs for ignition to the ignition plug combinations 7a–7c.

Engines for use on two-wheeled motorcycles are classified by the number of reference position sensors and the number of output drivers as shown in the following Table 1:

TABLE 1

|  | Reference Position Sensors | Output Drivers |
| --- | --- | --- |
| I In-line 2-cylinders (360° crank) In-line 2 cylinders (180° crank) | 1 | 1 |
| II In-line four cylinders V-2 cylinders | 2 | 2 |
| III In-line 6 cylinders | 3 | 3 |

As shown above, the number of reference position sensors is equal to the number of output drivers, that is, the number of ignition coil/plug pair combinations. Each of the output drivers can be controlled in a 1:1 correspondence with a reference position sensor by a single control unit. Therefore, the controller 1-2 in the ignition control apparatus can control all kinds of engines by providing as many control units as necessary. Since the controller 1-2 is of a complicated construction including expensive CPUs and other components, it would be undesirable from the standpoint of fabrication, maintenance and storage if there were as many different controllers as there are kinds of engines. With the arrangement of the present invention, however, the controller comprises a combination of control units each for controlling its associated ignition coil in a 1:1 correspondence with respect to a reference position sensor. Accordingly, an ignition control apparatus adaptable for all kinds of engines can be constructed by combining control units of the same construction and an input-output section suitable for a particular type of engine used. The length of cables connected between the engine and the ignition control apparatus varies with applications. To cope with this, only the input-output unit would be changed without requiring any alteration in the controller which would otherwise result from a change in the length of the cables.

Figure 2A:
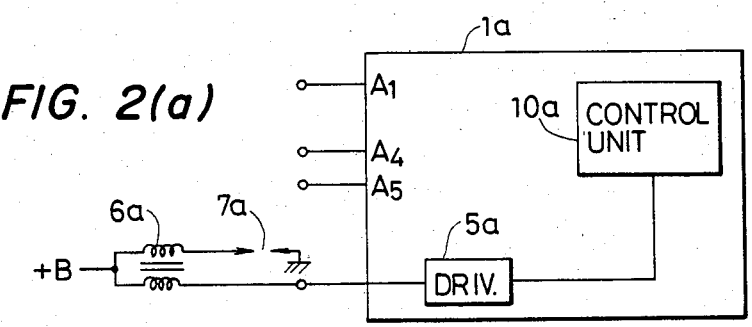
FIGS. 2(a)-2(c), are block diagrams of engine ignition control arrangements adapted to a variety of engines.
Figure 2B:
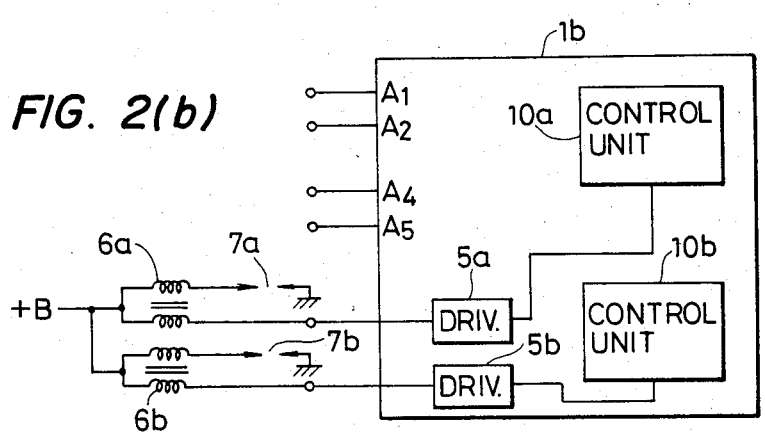
Figure 2C:
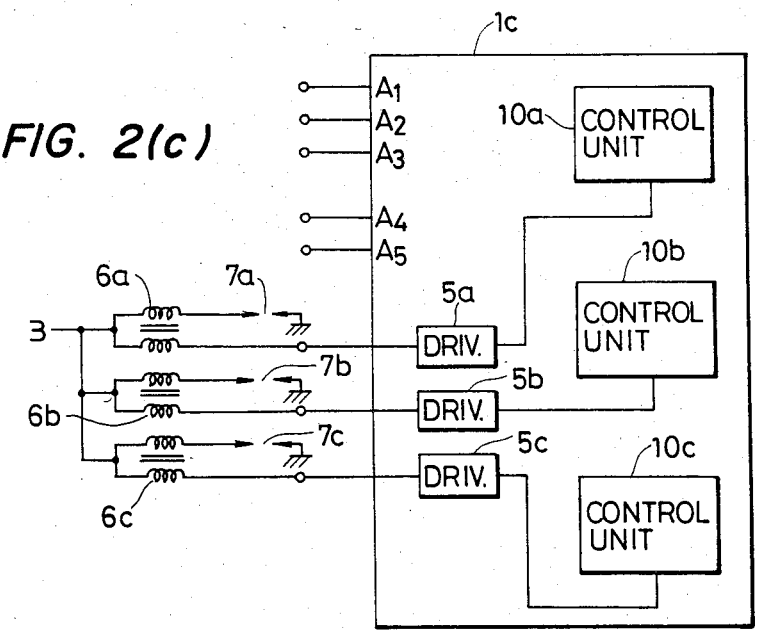

FIGS. 2(a)–2(c) illustrate different arrangements respectively for the engine types I through III shown in the Table 1. Where only a single reference position sensor and single ignition coil are employed as with the type I, an input-output unit 1a having a single driver 5a is combined with a single control unit 10a as illustrated in FIG. 2(a). For two reference position sensors and two ignition coils, an input-output unit 1b having two drivers 5a and 5b is associated with two control units 10a and 10b as shown in FIG. 2(b). For three reference position sensors and three ignition coils, a combination of three drivers 5a–5c and three control units 10a–10c are employed, as illustrated in FIG. 2(c). Therefore, the controllers may contain one or more control units each having a minimum capacity to control a single ignition coil. Accordingly, the control units can be shared by an increased number of applications.

Figure 7:
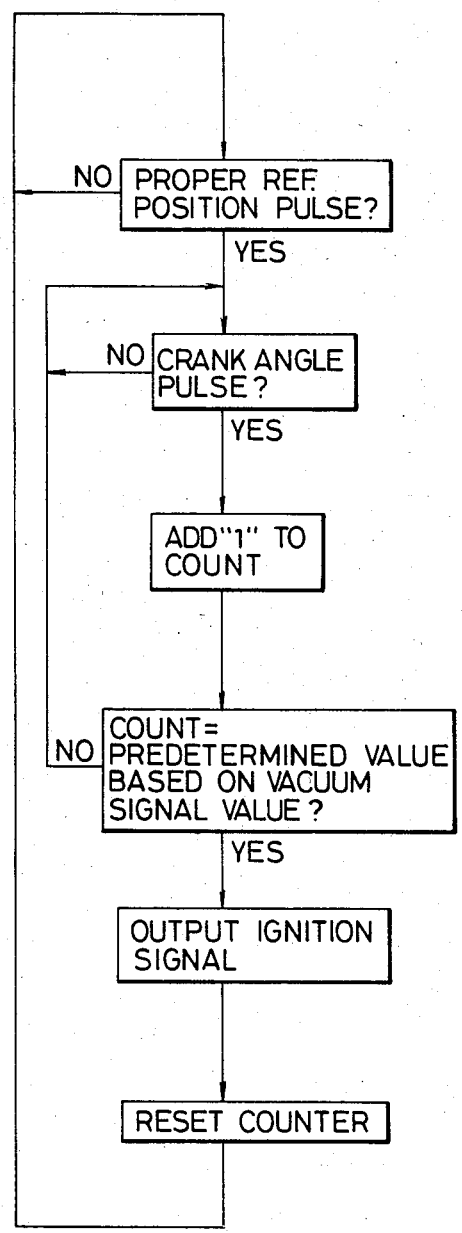
FIG. 7 is a flow chart for the control of CPU 11 of FIG. 1.

FIG. 7 is a flowchart for a control program capable of operating the CPU 11. The CPU 11 can be the well known 8048 eight bit microprocessor produced by Intel or NEC. The flow chart illustrates that the reference position pulses are used to initiate the counting of the crank angle pulses. When the crank angle pulse count reaches a predetermined value an ignition signal is output and the CPU 11 waits for another occurrence of the proper reference position pulse. The issuance of the ignition signal with the proper timing and dwell angle depends not only on the crank angle count but on the vacuum signal. In order to facilitate proper issuance of the ignition signal a table look-up method executed by the CPU using a local read only memory containing angle count and vacuum signal indexes can be used.

With the engine ignition control apparatus of the present invention, as described above, the controller comprises a single or a combination of control units each for controlling a single ignition coil, and the portion of the apparatus which is shared by various applications is enlarged. The engine ignition control apparatus can easily be fabricated, maintained and stored, and its adaptability to various engines is improved.

The many features and advantages of the invention are apparent from the detailed specification and, thus, it is intended by the appended claims to cover all such features and advantages of the apparatus which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An engine ignition control apparatus for an engine with a crank, comprising:
    N reference position sensors, positionable next to the engine, for sensing the position of the engine and for generating reference position signals therefrom, where N is greater than or equal to 1;
    a crank angle sensor, positionable next to the engine crank, for sensing the angle of the engine crank and for generating crank angle signals therefrom;
    a vacuum sensor, operatively connectable to the engine, for generating a vacuum signal;
    waveform shaping means, operatively connected to said crank angle sensor and said N reference position sensors, for shaping the crank angle and reference position signals;
    interpolation means, operatively connected to said waveform shaping means, for interpolating the reference position signals when one or more of the N reference position sensors fail; and
    a single ignition control module comprising N interchangeable control means, operatively connected to said waveform shaping means, said interpolation mans and said vaccum sensor and each corresponding to a respective one of said N reference position sensors, for generating ignition control signals, each of said N control means generating respective ignition control signals in dependence upon the crank angle signal, the respective reference position signal and the vacuum signal; and
    N ignition assemblies, each operatively connected to the respective one of said N control means, for providing engine ignition.

2. An engine ignition control apparatus as recited in claim 1, wherein each of said N control means comprises a processor, operatively connected to said waveform shaping means, said interpolation means, said vacuum sensor and the respective one of said N ignition assemblies, for generating the ignition control signals in dependence upon the crank angle signal, the respective reference position signal and the vacuum signal.

3. An engine ignition control apparatus as recited in claim 2, wherein said apparatus is connected to a voltage supply, and wherein each of said N control means further comprises:
    failure detector means, operatively connected to said processor, for generating a malfunction signal in dependence upon the voltage of the voltage supply and the proper operation of said processor; and
    selector means, operatively connected to said processor, said interpolation means and the respective one of said N ignition assemblies, for passing therethrough the ignition control signals from said processor or for outputting replacement ignition control signals in dependence upon the malfunction signal.

4. An engine ignition control apparatus as recited in claim 3, wherein said failure detector means comprises a failure detector circuit.

5. An engine ignition control apparatus as recited in claim 4, wherein said failure detector circuit comprises:
    a low voltage detector circuit operatively connected to the voltage supply;
    a monitoring circuit operatively connected to said processor, said low voltage detector circuit and said selector means; and
    a reset circuit operatively connected between said monitoring circuit and said processor.

6. An engine ignition control apparatus as recited in claim 5, wherein said selector means comprises a data selector circuit operatively connected to said processor, said interpolation means and said monitoring circuit.

7. An engine ignition control apparatus as recited in claim 6, wherein said interpolation means comprises:
    a counter operatively connected to said waveform shaping means;
    a decoder operatively connected to said counter; and
    a logic circuit operatively connected to said decoder and said processor.

8. An engine ignition control apparatus as recited in claim 7, further comprising N drives operatively connected between respective ones of said processors and respective ones of said N ignition assemblies.

9. An engine ignition control apparatus as recited in claim 8, wherein each of said N ignition assemblies comprise an ignition coil operatively connected to a respective one of said N drivers.

10. An engine ignition control apparatus operatively connectable to an engine having a crank, N reference position sensing means for sensing an engine position and generating a respective reference position signal, crank angle sensing means for sensing a crank angle of the engine, vacuum sensing means for sensing an engine vacuum and N ignition assemblies where N is an integer greater than or equal to 1 and equals the number of cylinders in the engine divided by two and rounded up, said apparatus comprising:
    shape and interpolation means, operatively connectable to the N reference position sensing means and the crank angle sensing means, for generating respective reference position signals and crank angle signals; and
    a single ignition control module comprising N interchangeable control means, operatively connected to said shape and interpolation means and operatively connectable to said vacuum sensing means and respective ones of said N ignition assemblies, each for generating a respective ignition control signal for controlling the respective one of said N ignition assemblies in dependence upon the respective position signal, the crank angle and the engine vacuum.

* * * * *

UNITED STATES PATENT AND TRADEMARK OFFICE
CERTIFICATE OF CORRECTION

PATENT NO. : 4,499,875

DATED : February 19, 1985

INVENTOR(S) : Katayama et al.

It is certified that error appears in the above-identified patent and that said Letters Patent is hereby corrected as shown below:

Col. 5, line 48, "mans" should be --means--.

Signed and Sealed this

Twentieth Day of August 1985

[SEAL]

Attest:

DONALD J. QUIGG

*Attesting Officer*     *Acting Commissioner of Patents and Trademarks*